(12) United States Patent
Mercat et al.

(10) Patent No.: US 7,631,947 B2
(45) Date of Patent: Dec. 15, 2009

(54) WHEEL INCLUDING A RIM, A HUB, AND A DEVICE FOR CONNECTING THE RIM TO THE HUB

(75) Inventors: Jean-Pierre Mercat, Chavando (FR); Philippe Renard, Aix les Banes (FR)

(73) Assignee: Salomon S.A.S., Metz-Tessy (FR)

( * ) Notice: Subject to any disclaimer, the term of this patent is extended or adjusted under 35 U.S.C. 154(b) by 28 days.

(21) Appl. No.: 11/641,688

(22) Filed: Dec. 20, 2006

(65) Prior Publication Data

US 2007/0138859 A1    Jun. 21, 2007

(30) Foreign Application Priority Data

Dec. 21, 2005  (FR) .................................. 05 13086
Apr. 3, 2006   (FR) .................................. 06 02877

(51) Int. Cl.
  *B60B 5/00*  (2006.01)
  *B60B 1/02*  (2006.01)
(52) U.S. Cl. ............................. 301/104; 301/58; 301/59
(58) Field of Classification Search .................. 301/55, 301/58–59, 61, 104
  See application file for complete search history.

(56) References Cited

U.S. PATENT DOCUMENTS

| 4,681,647 | A | * | 7/1987 | Kondo et al. ................. 156/172 |
| 5,110,190 | A | * | 5/1992 | Johnson ........................ 301/55 |
| 6,036,279 | A | * | 3/2000 | Campagnolo ................. 301/55 |
| 6,036,281 | A | | 3/2000 | Campbell | |
| 6,238,008 | B1 | * | 5/2001 | Forsythe et al. ............... 301/55 |
| 6,520,595 | B1 | * | 2/2003 | Schlanger ..................... 301/59 |
| 2007/0063574 | A1 | * | 3/2007 | Mercat et al. ................. 301/55 |

FOREIGN PATENT DOCUMENTS

| DE | 94 16 688 U1 | 10/1996 |
| EP | 1 304 238 A1 | 4/2003 |
| FR | 2 586 378 A1 | 2/1987 |
| FR | 2 762 267 A1 | 10/1998 |
| FR | 2 784 622 A1 | 4/2000 |
| FR | 2 792 251 A1 | 10/2000 |
| NL | 1 015 285 C2 | 11/2001 |
| WO | WO-03/020535 A2 | 3/2003 |

* cited by examiner

*Primary Examiner*—Jason R Bellinger
(74) *Attorney, Agent, or Firm*—Greenblum & Bernstein P.L.C.

(57) ABSTRACT

A wheel including a rim, a hub, and at least one device for connecting the rim to the hub, the connecting device including a composite spoke and a first mechanism to connect the spoke to the rim or the hub, the spoke including an elongated body, which extends in a longitudinal direction, between a first end and a second end, the body and the ends including fibers, the fibers being arranged to form a first loop at the first end. The first connecting mechanism includes a first insert housed in the first loop, a first shank affixed to the first insert, the first shank being oriented along the longitudinal direction, a first screw or fastening portion being defined on the first shank.

23 Claims, 5 Drawing Sheets

WHEEL INCLUDING A RIM, A HUB, AND A DEVICE FOR CONNECTING THE RIM TO THE HUB

CROSS-REFERENCE TO RELATED APPLICATIONS

This application claims priority under 35 U.S.C. § 119 of French Patent Application No. 05.13086, filed on Dec. 21, 2005, and French Patent Application No. 06.02877, filed on Apr. 3, 2006, the disclosures of which are hereby incorporated by reference thereto in their entireties.

BACKGROUND OF THE INVENTION

1. Field of the Invention

The invention relates to the field of wheels, each of which includes a rim, a hub, and at least one device for connecting the rim to the hub, with the connecting device including at least one composite spoke and one mechanism for connecting the spoke to the rim or to the hub. The invention also relates to the connecting device itself.

More particularly, the invention relates to wheels and connecting devices of the aforementioned type, which are adapted to bicycles, as well as to other vehicles such as wheelchairs, or the like.

2. Description of Background and Relevant Information

A device for connecting the rim of a spoked wheel to a hub includes, by definition, at least one spoke. The spoke has an elongated body that extends between a first end and a second end.

Conventionally, a spoke is made of metal, because metal facilitates the shaping of the ends. An end can be configured, for example, to enable the end to be fastened directly to the rim or hub, such as by means of a threaded end, or to be threaded for cooperation with a correspondingly threaded nut. An advantage of a metallic spoke, therefore, is that the fabrication of the spoke is easy and inexpensive.

However, metallic spokes have drawbacks, such as their heavy weight, which adds to the weight of the wheel and, of course, the overall weight of the vehicle to which the wheel is a part. Another drawback of metallic spokes is their relatively low resistance to tension forces or material fatigue, which requires that the tension in each spoke be monitored during assembly and use.

In order to remedy these drawbacks, the prior art has proposed to make a spoke that includes a composite material, such as, for example, resin-bound carbon fibers.

In this regard, the patent document FR 2 762 267 discloses the manufacture of a spoke having a body made of composite material, which includes two straight elongated portions united by two rounded portions. The spoke thereby has the general shape of an oblong ring. An advantage of this structure is a reduced weight, which lightens the weight of the wheel. Another advantage is a great resistance to tension or fatigue. Thereby, the wheel requires less maintenance.

The use of the spokes according to the document FR 2 762 267 has drawbacks, however. For example, the arrangement by which the spoke is connected to the rim or to the hub is heavy and complicated. Indeed, such arrangement includes a shank, which extends the rounded portion of the spoke, as well as a clevis, which is connected to the shank. The combination of the shank and the clevis forms a bulky and heavy articulation. Furthermore, its implementation is complicated because some provision is required to be made for connecting the clevis to the rim or to the hub. As a consequence, the benefits gained in a reduction in the weight of the body of the spoke are lost, at least in part, by the disadvantage in the increase in the weight of the connection.

Modifying the structure of a composite spoke, therefore, has been proposed.

For example, the patent document FR 2 792 251 proposes a spoke made of a composite material. The body of the spoke includes a single elongated portion that extends between a first end and a second end. Each end is formed as a loop inside of which a reinforcing core is housed. To connect an end to a rim or hub, a hollow cap is provided to receive the loop, as well as a hollow screw that receives the cap.

The advantage of the spoke according to the document FR 2 792 251 is that it is lighter due to the structure of its body. However, the connection assembly with which it is associated remains relatively bulky and heavy because they enclose the loops. Furthermore, manufacturing and implementing the connection assembly are relatively complicated.

As with the spoke and connection assemblies of FR 2 762 267, the benefits gained in the reduction in weight of the body of the spoke of FR 2 792 251, which are made of a composite material, are lost, at least in part, by the disadvantage in the assembly for connecting the spoke to the rim and/or for connecting the spoke to the hub. Furthermore, the connection assembly for FR 2 792 251 is relatively complex.

SUMMARY OF THE INVENTION

In view of the above, the invention optimizes the connecting device and, particularly, the invention lightens the one or more devices for connecting a spoke to the rim or to the hub of a wheel.

Further, the invention simplifies the one or more devices for connecting either end of the spoke to the rim and/or to the hub.

Still further, the invention provides for a lighter wheel, which includes at least one spoke made from a composite material.

To this end, the invention is directed to a rim, a hub, and at least one device for connecting the rim to the hub, the connecting device including a composite spoke and a first mechanism for connecting the spoke to the rim or to the hub, the spoke including an elongated body that extends in a longitudinal direction between a first end and a second end, the body and the ends including fibers, the fibers being arranged to form a first loop at the first end.

The first connecting mechanism of a wheel according to the invention includes a first insert housed in the first loop, a first shank affixed to the first insert, the first shank being oriented along the longitudinal direction, a first threaded or fastening portion being defined on the first shank.

The body of the spoke is thus connected to the rim or the hub by means of the insert and the shank. Because the insert is housed within the loop, the tension forces of the spoke are transmitted in a longitudinal direction through the inside of the loop. These forces are transmitted by elements having a reduced volume. Indeed, the insert is inside the loop. Consequently, the weight of the device for connecting the spoke to the rim or hub is reduced with respect to the assembly of the prior art.

A resulting advantage of the invention is that the inertia of the connecting device is reduced. Furthermore, the structure of the connecting device is simple, which makes manufacturing and assembling the device easier. Another advantage is that the fibers are biased in tension, along the longitudinal direction. This provides the spoke with greater strength. A further advantage results from the wheel being lighter; indeed, with a reduced inertia, the wheel provides an improved dynamic behavior. In the case of such a wheel used on a bicycle, for example, accelerating is easier.

BRIEF DESCRIPTION OF DRAWINGS

Other characteristics and advantages of the invention will be better understood from the description that follows, with reference to the annexed drawings showing, according to non-limiting embodiments, how the invention can be implemented, and in which.

DETAILED DESCRIPTION OF THE INVENTION

Although the following description of detailed embodiments of the invention relate to a wheel adapted for a bicycle, it is to be understood that, as mentioned above, the invention also encompasses spokes and wheels for other types of vehicles.

The first embodiment of the invention is shown in FIGS. 1 to 8.

As can be understood from FIGS. 1, 2, 3, and 8, a wheel includes a rim 1, a hub 2, and at least one device 3 for connecting the rim 1 to the hub 2.

The connecting device 3 includes a composite spoke 4, a first mechanism 5 for connecting the spoke 4 to the rim 1, as well as a second mechanism 6 for connecting the spoke 4 to the hub 2.

Figures 1, 2, 3:
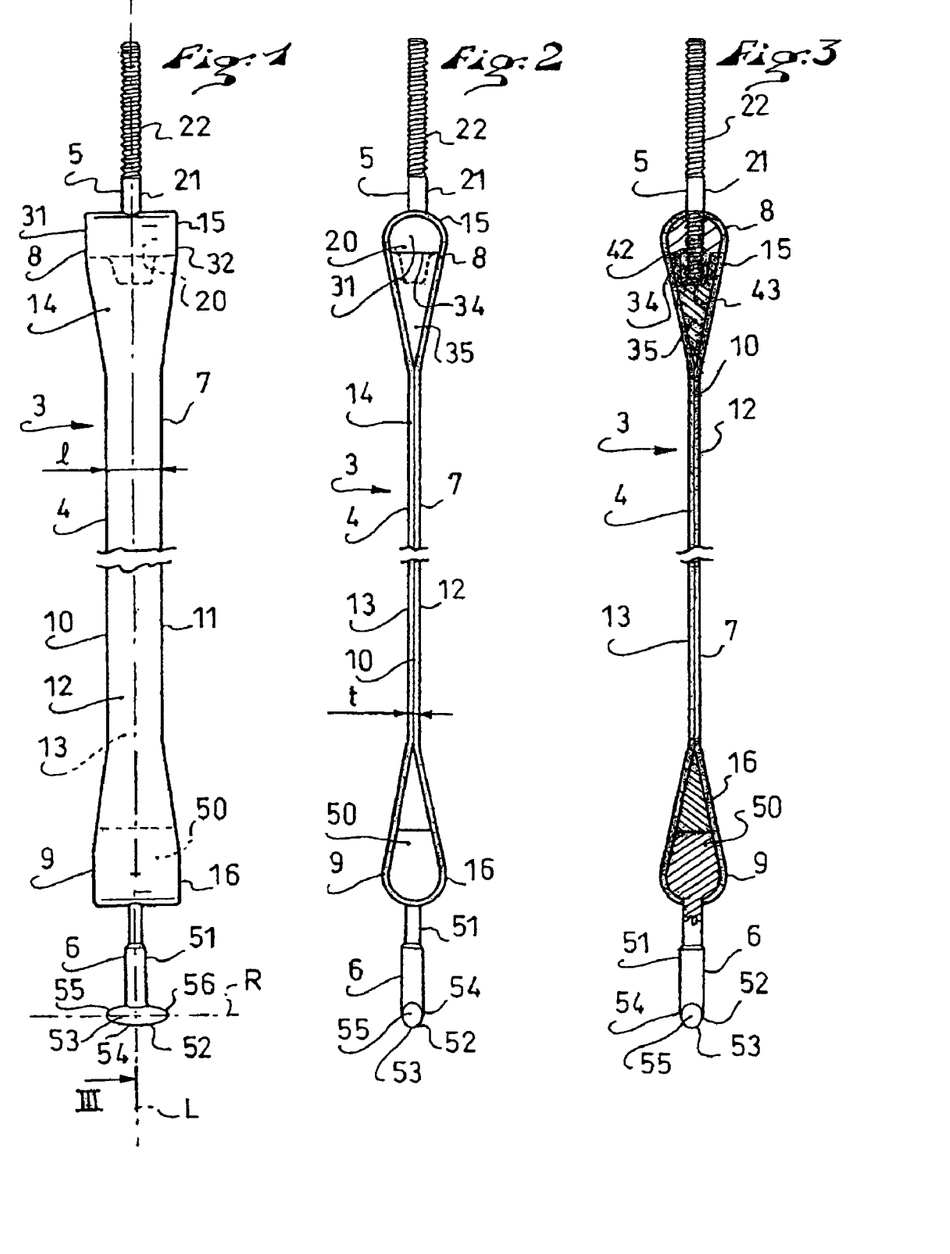
FIG. 1 is a front view of a connecting device according to a first embodiment of the invention.
FIG. 2 is a side view of the device of FIG. 1.
FIG. 3 is a cross section along the line III-III of FIG. 1.
Figures 4, 5:
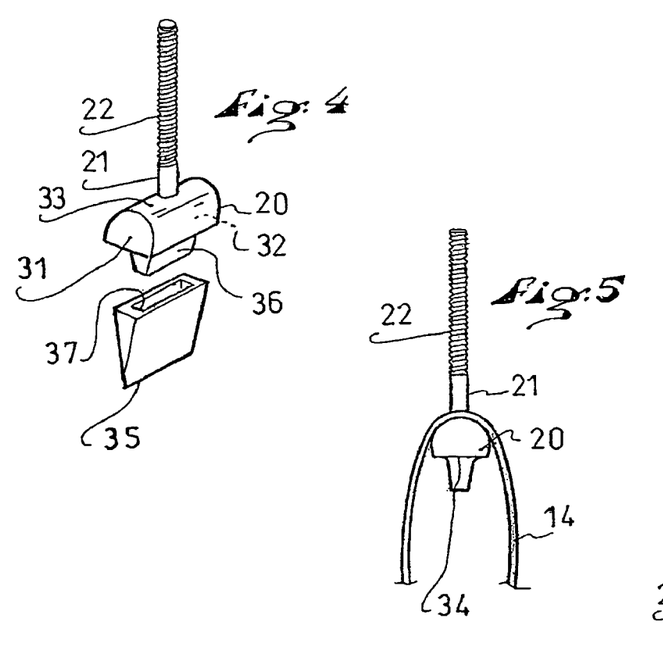
FIG. 4 is a perspective view of constituent elements of the device of FIG. 1.
FIG. 5 is a schematic view relative to the manufacturing of the device of FIG. 1.

The composite spoke 4 itself includes an elongated body 7, which extends along a longitudinal direction L between a first end 8 and a second end 9. The elongated body 7 extends width-wise between a first side 10 and a second side 11, and thickness-wise between a first surface 12 and a second surface 13.

The elongated body 7 and the ends 8, 9 include fibers 14.

According to the first embodiment of the invention that is illustrated, the fibers 14 are arranged to form a first loop 15 at the first end 8, as well as a second loop 16 at the second end 9. Thereby, the first end 8 includes the first loop 15 and the second end 9 includes the second loop 16. It is also within the scope of the invention to have only a single loop, either in the area of the first end 8 or in the area of the second end 9.

The elongated body 7 and the ends 8, 9 form a unitary piece, that is, manifested as only a one-piece element, which can be made by any known method according to a certain number of stages of manufacture. For example, it can be provided to wind a multifilament strand made of dry carbon fibers and then to guide the strand in a container to have it impregnated with a material that enables the cohesion of the fibers. The material can be a thermosetting resin or another material, such as a thermoformable synthetic material. The impregnated strand is then belt-wound. According to a particular embodiment, a plurality of windings are performed, which prevents, or substantially reduces, a discontinuity in the thickness of the spoke 4. It is indeed possible to add localized reinforcements to the belt to modify its thickness.

The fibers 14 are oriented substantially in the longitudinal direction L.

The belt is then positioned inside a mold to be shaped and subject to a temperature increase. When taken out of the mold, the elongated body 7 and the loops 15, 16 form a unitary piece having a stable shape, which means that the piece does not deform unless an external force is applied.

The method for manufacturing the connecting device 3 can include other stages of manufacture, which will be describe hereinafter.

The general appearance of the elongated body 7 is that of a bar with a substantially rectangular cross section, the width 1 and the thickness t of which are substantially uniform along its length. Alternatively, however, the width or the thickness can be provided to vary in order, for example, to provide the spoke 4 with aerodynamic properties. Thus, the cross section of the elongated body 7 can have any shape, such as a square, a rectangle, oblong, elliptical, or the like.

According to the invention, as shown in FIGS. 1 to 8, the first connecting mechanism 5 includes a first insert 20 housed in the first loop 15, a first shank 21 affixed to the first insert 20, the first shank 21 being oriented along the longitudinal direction L, the first shank 21 including a first screw portion 22. In this case, the screw portion 22 of the shank is in the form of a threading.

As is described below, the screw portion 22, i.e., the threaded portion, is transversely and thickness-wise centered relative to the insert 20 in order to avoid any flexion, which could harm its tensile strength.

Figure 8:
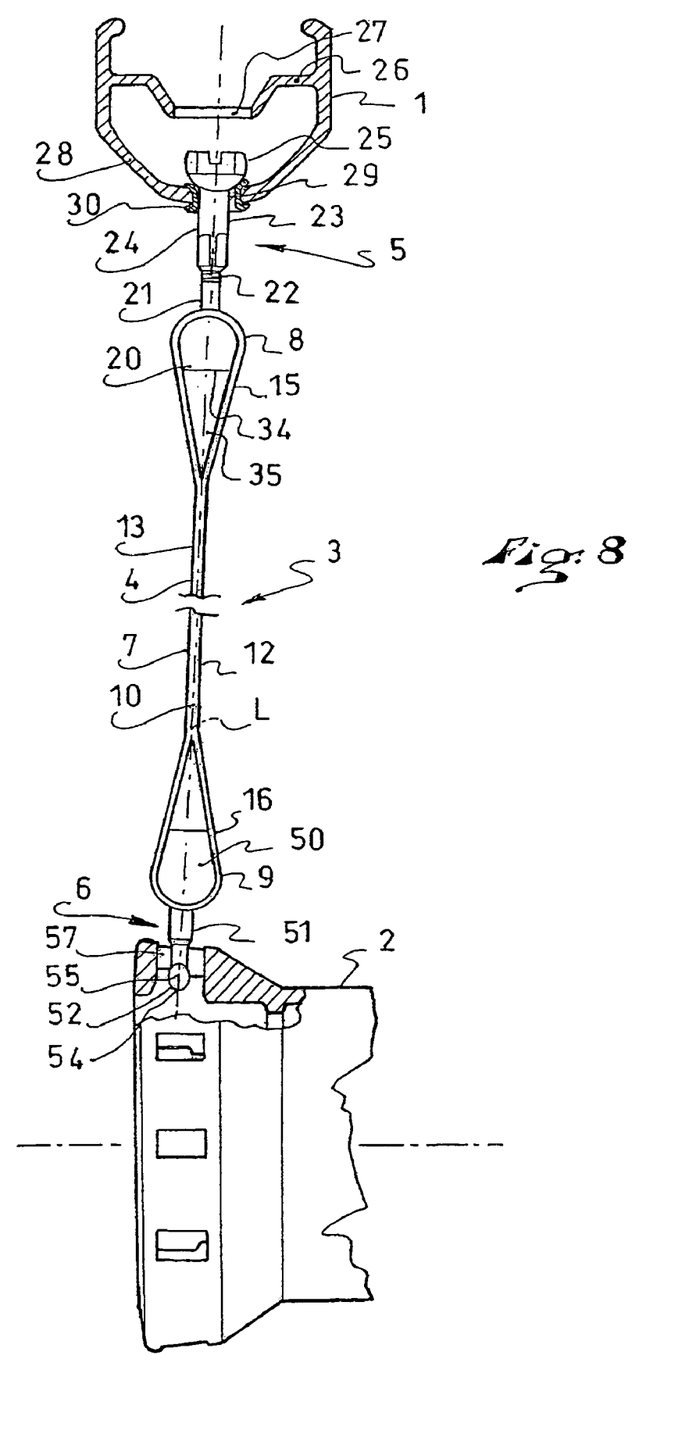
FIG. 8 is a partial schematic cross section of a wheel to explain the connections of a spoke to the hub and rim.

The first threaded portion 22 enables the forces to be directly transmitted between the spoke 4 and the rim 1. Indeed, the threaded portion 22 is screwed in a nut 23, or screw nut, which is itself retained by the rim 1, as shown in FIG. 8. Retaining the screw nut 23 in the rim is made possible by the shape of the elements. The screw nut 23 includes a body 24 and an enlarged head 25. The rim 1 includes a first bridge 26 with a hole 27 for the screw nut to pass through, as well as a second bridge 28 with a hole 29 for the body 24 of the screw nut to pass through. Secondarily, a ring or eyelet 30 is positioned in the hole 29 of the second bridge 28 to consolidate the seat of the head 25 on the bridge 28. This is particularly useful when the rim includes an aluminum-based alloy. The eyelet 30 is made of steel, or any other suitable material.

In the area of the first connecting mechanism 5, the forces are directly transmitted between the spoke 4 and the rim 1 due to the simplicity of the screw/nut connection provided by the threaded portion 22 (i.e., the screw) and the nut 23 of the first connecting mechanism 5. In fact, the screw 22 is unique because the first shank 21 is unique. As a result, the screw nut 23 is also unique. Thus, the first connecting mechanism 5 includes only one screw-nut connection. An advantage of this connection is to make adjusting the tension of the connecting device 3, and thus, of the spoke 4, easier. No flexion is exerted in the spoke.

Figure 6:
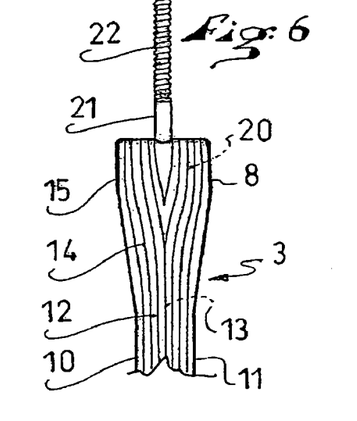
FIG. 6 is a partial schematic view of FIG. 1, to explain how the fibers are arranged inside a spoke of the device.
Figure 7:
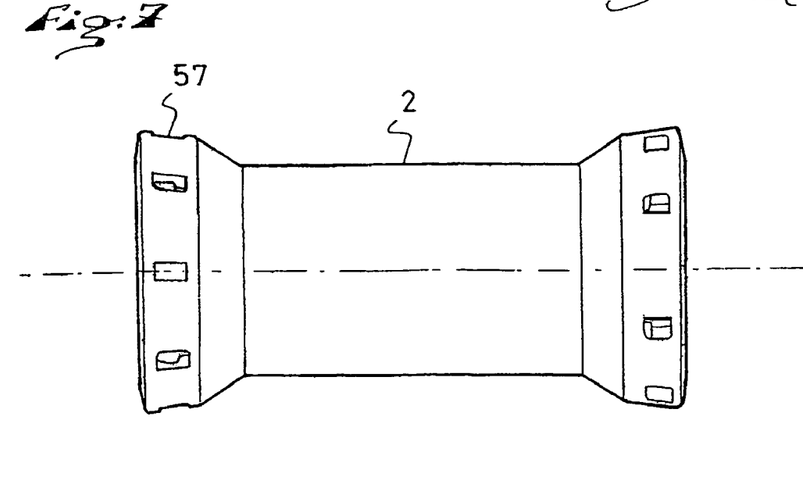
FIG. 7 is a longitudinal view of a hub of a wheel.

The first shank 21 is also affixed to the insert 20. The insert 20 extends transversely between a first lateral surface 31 and a second lateral surface 32. These surfaces 31, 32 are, for example, planar or substantially planar and oriented in the longitudinal direction L. The insert 20 has, between the lateral surfaces 31, 32, a connecting surface 33 that is curved and comes in contact with fibers 14 of the spoke 4 so as to provide the first end 8 with the loop shape 15, in the case where the insert 20 and the belt are simultaneously positioned inside the mold. Opposite the connecting surface 33, the insert 20 has, for example, an end 34. As can be seen in FIGS. 1 and 6, e.g., the width of the insert 20 (i.e., the distance between lateral surfaces 31, 32 and perpendicular to the longitudinal direction L) can be substantially equal to the width of the loop 15 of the spoke 4. An objective of the shape of the insert 20 and these surfaces is to reduce the volume of the insert 20, as much as possible, and therefore its mass. This lightens the connecting device 3.

According to the first embodiment of the invention, a plug 35 is housed in the first loop 15, between the insert 20 and the elongated body 7 of the spoke 4. The plug 35 comes in contact with the end 34 of the insert. The end 34 has a projection 36 which is shaped for nesting in a cavity 37 of the plug 35. Therefore, the plug is better retained on the insert 20. The plug 35 completes the filling of the loop 15. The plug 35 includes a low-density material, such as a synthetic material, foam, or a hollow element, to lighten further the first connecting mechanism 5. Further, the use of the plug is optional within the scope of the invention.

The insert 20 and the plug 35 make a drop-shaped assembly, the assembly closely fitting inside the loop 15 of the first end 8 of the spoke.

According to the first embodiment of the invention, the first shank 21 is affixed to the first insert 20 by means of a screw-threaded connection. To this end, the first shank 21 has a second screw portion 42, or threaded portion, opposite the first threaded portion 22. This second portion 42 is screwed inside a threaded opening 43 of the insert. The opening 43 is oriented along the longitudinal direction L. Therefore, when it is screwed into the insert 20, the shank 21 is oriented lengthwise with respect to the body 7 of the spoke 4. The first shank 21, with its two threaded portions 22, 42, forms a stud.

In order to balance the distribution of the longitudinal forces, which are transmitted through the connecting device 3, the first shank 21 is substantially aligned with a central longitudinal axis of the spoke 4. This axis is designed in the drawings by the reference character L. For this reason, the shank 21 is positioned substantially midway between the lateral surfaces 31, 32 of the insert 20. In other words, the threaded opening 43 is also substantially midway between the lateral surfaces 31, 32. The insert is transversely symmetrical with respect to the axis of the threaded opening 43. The insert 20 is also symmetrical thickness-wise.

Still in terms of balancing the forces, the first shank 21 extends through the first loop 15 substantially in its center, that is, midway between the first 10 and second 11 sides of the spoke 4. As can be seen in the drawings, the shank 21 extends in the longitudinal direction L through the extreme end of the spoke 4, i.e., through the widened end of the loop 15 of the spoke.

According to the first embodiment of the invention, and in a non-limiting manner, extending the shank 21 through the loop 15 is made possible by spacing the fibers 14 apart at the time of manufacture. In fact, another stage of the manufacturing method involves spacing the fibers 14 apart and passing the shank 21 into the loop 15 before the assembly comprised of the spoke 4, the first insert 20, and the first shank 21, is positioned in the mold. The shank can be screwed into the insert, either before or after it is positioned in the loop 15. In a particular embodiment, the plug 35 is placed in the mold with the assembly, but it could alternatively be added afterward, that is, when the body 7 and the loops 15, 16 have taken their final shapes. The plug 35 can also be injected during the molding operation.

Given that the fibers 14 have been spaced apart to let the shank 21 through, the first loop 15 is wider than the elongated body 7. An advantage resulting from this construction is to preserve the continuity of the fibers 14. The spacing apart is provided so as to allow an equivalent quantity of fibers to pass on each side of the shank 21. This makes the first end 8 transversely symmetrical with respect to a central longitudinal axis, which results in the forces being longitudinally transmitted. No flexion torque or moment is exerted on the shank 21 or the loop 15.

The construction of the device 3 is such that the first shank 21 is transversely centered with respect to the first loop 15, as well as with respect to the elongated body 7. Thus, the connecting device 3 is transversely symmetrical. The device 3 is also symmetrical thickness-wise. As a result, the composite spoke 4 is also transversely and thickness-wise symmetrical. Thus, the useful forces that are transmitted in the spoke 4 are entirely transmitted. There is no interfering dispersion. The forces are balanced.

According to the invention, the second connecting mechanism 6 includes a second insert 50 housed in the second loop 16, a second shank 51 affixed to the second insert 50, the second shank 51 being oriented along the longitudinal direction L, a second fastening portion 51 being defined on the second shank. In this case, the fastening portion 52 includes a T-shaped enlarged head 53. For example, the head 53 includes an elongated body 54 that extends longitudinally between a first end 55 and a second end 56 along an axis R. The axis R is oriented, for example, perpendicularly with respect to the longitudinal direction of the spoke 4 and along the width 1 of the spoke 4.

According to the embodiment illustrated, the second fastening portion 52, the second shank 51, and the insert 50 form a unitary piece, i.e., a one-piece element, which can include, for example, a metal or any other suitable material.

In terms of fabrication and shape, except for the fastening portion and the connection of the shank 51 to the insert 50, the second connecting mechanism 6 is similar, or even identical, to the first one 5. The symmetries that enable direct transmissions of forces are present.

The head 53 is fastened to the hub 2 by insertion in a recess 57 of the hub, and then by a 90° rotation. The shape and dimensions of the recess 57 correspond to those of the elongated body 54. The body 54 is arranged perpendicularly with respect to the longitudinal direction of the recess 57 during the retaining. The shape of the recess 57 enables a rotational immobilization of the device 3 when a tension force is exerted thereon. This technique is known to one having ordinary skill in the art.

Other embodiments are shown in FIGS. 9 to 16. For reasons of convenience, only the differences with respect to the first embodiment are shown.

Figure 9:
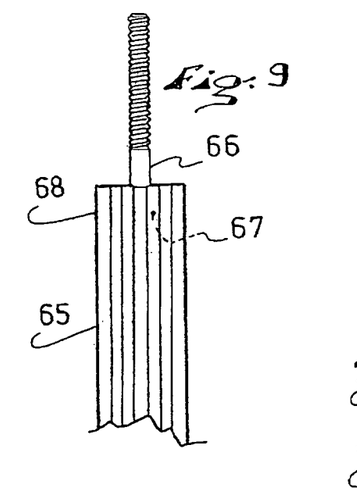
FIG. 9 is a partial front view of a device according to a second embodiment of the invention.

The second embodiment is shown in FIG. 9. A connecting device includes a composite spoke 65 as well as a connecting mechanism provided with a shank 66. The shank 66 is screwed into an insert 67 after the spoke 65 has been shaped by means of the mold. To this end, the spoke 65 is pierced with a drill, for example, in the area of a loop 68. Thereby, the spoke 65 can maintain a constant width over its entire length, that is, in the area of the body and ends. Local reinforcements can be added in order to compensate for a structural weakening due to piercing.

Figure 10:
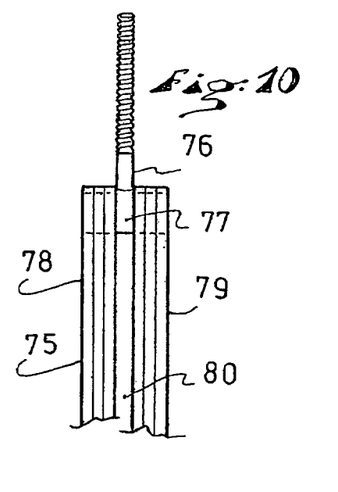
FIG. 10 is a partial front view of a device according to a third embodiment of the invention.

The third embodiment of the invention is shown in FIG. 10. A connecting device includes a composite spoke 75, as well as a connecting mechanism provided with a shank 76 and an insert 77. Here, the spoke 75 includes two distinct arms 78, 79 separated by a clearance 80. The width of the clearance is, for example, close to or equal to that of the shank 76. The two arms 78, 79 have the same width, for example. The clearance extends from the shank 76. Thus, the forces are balanced. A resulting advantage of this construction is an even lighter spoke 75.

Figure 11:
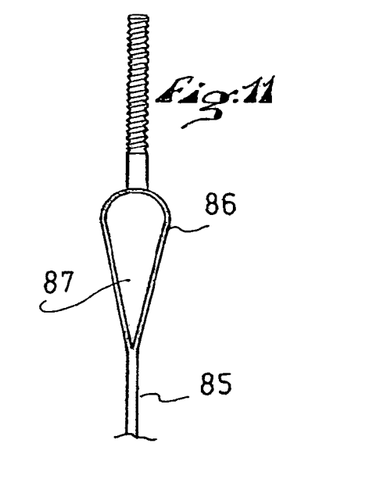
FIG. 11 is a partial side view of a device according to a fourth embodiment of the invention.

The fourth embodiment is shown in FIG. 11. A connecting device Includes a composite spoke 85 and a first loop 86. An insert 87 is housed in the loop 86 so as to fill it entirely. No plug is used. A resulting advantage of this construction is the reduced number of manufacturing operations.

Figure 12:
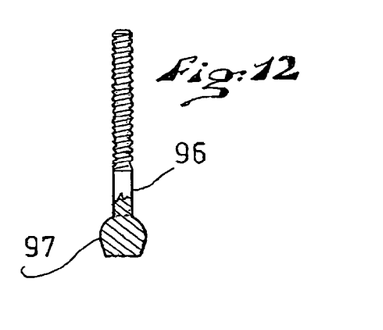
FIG. 12 is a view of an insert and a shank for connecting a composite spoke according to a fifth embodiment of the invention.

The fifth embodiment is shown in FIG. 12. A connecting device includes a connecting mechanism, which includes a shank 96 and an insert 97. The shank 96 and the insert 97 form a unitary piece. This structure allows an operation for assembling the shank to the insert to be omitted.

Figure 13:
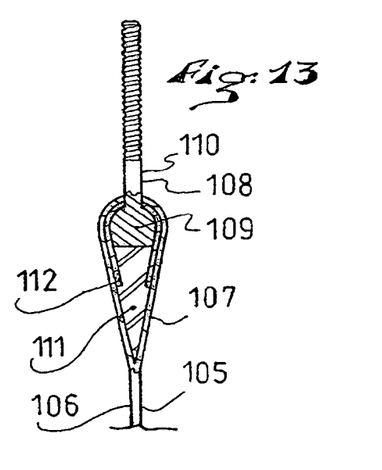
FIG. 13 is a view, similar to that of FIG. 3, according to a sixth embodiment of the invention.

The sixth embodiment is shown in FIG. 13. A connecting device includes a composite spoke 105 having a body 106 and a loop 107. A connecting mechanism 108 includes an insert 109, a shank 110, and a plug 111. The connecting mechanism also includes a bushing 112 housed in the loop 107, in contact with the loop 107, and in part about the insert 109 and/or the plug 111. The bushing 112 allows the insert 109 to be preassembled with the plug 111. The bushing 112 contributes to evenly distributing the compression stresses between the insert 109 and the loop 107.

Figure 14:
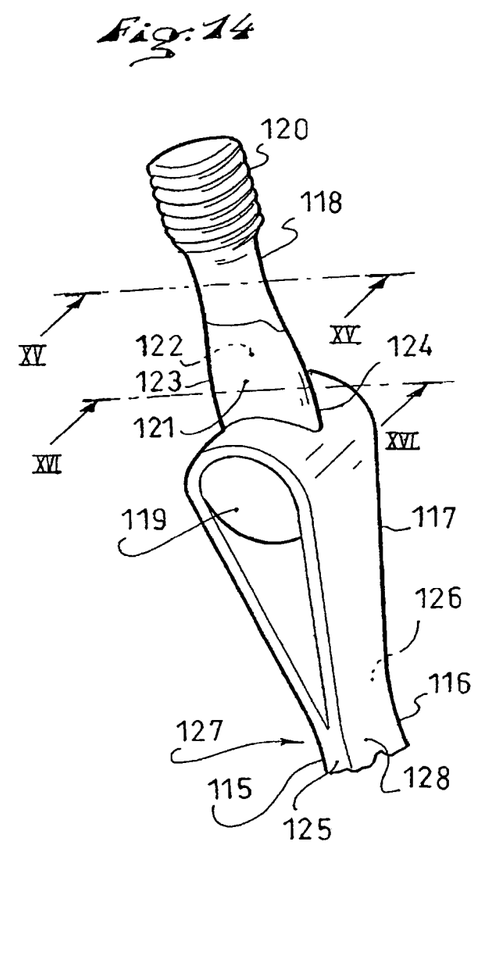
FIG. 14 is a perspective view of constituent elements of a device according to a seventh embodiment of the invention.
Figure 15:
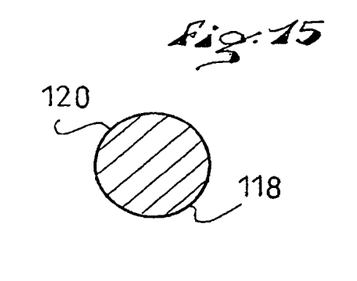
FIG. 15 is a cross section along the line XV-XV of FIG. 14.
Figure 16:
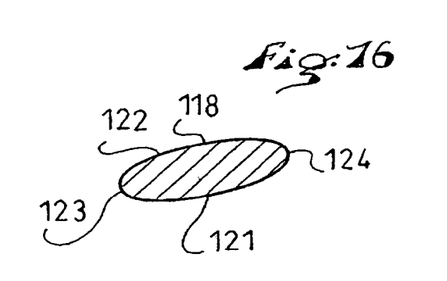
FIG. 16 is a cross section along the line XVI-XVI of FIG. 14.

The seventh embodiment is shown in FIGS. 14 to 16. A connecting device includes a composite spoke 115 having a body 116 and a loop 117. A shank 118 extends through the loop to be affixed to an insert 119. According to the seventh embodiment of the invention, the shank 118 and the insert 119 form a unitary piece including, for example, a metal. Between a screw-threaded end 120 and the insert 119, the shank 118 has a variable cross-section. On the side of the end or threaded portion 120, the cross section is round, or circular, as shown in FIG. 15. Conversely, the cross section of the shank 118 is narrower and elongated in the vicinity of the insert 119, as shown in FIG. 16. The cross section can have an elliptical, oblong, rectangular shape, or the like. Thus, toward the insert 119, the shank 118 has a first lateral surface 121 opposite a second lateral surface 122. The surfaces extend between two ends 123, 124 of the cross section. The lateral surfaces 121, 122 are parallel to the lateral edges 125, 126 of the spoke 115. In other words, the lateral surfaces 121, 122 are perpendicular to the surfaces 127, 128 of the body 116. In the illustrated embodiment, the shank 118 is centered between the lateral edges 125, 126, still so as to balance the distribution of forces. A particular advantage of using a partly flattened cross section of the shank 118, is a reduced spacing apart of the fibers in the area of loop 117. Thus, the fibers are barely spaced apart on both sides of the shank. The transmission of forces in the spoke 115 is even more direct. Consequently, the width of the loop 117 is only slightly greater than that of the body 116. The various cross sections of the shank 118 have, for example, the same surface area for an even distribution of stresses. However, this is optional.

Generally speaking, the invention is implemented using materials and according to techniques known to one having ordinary skill in the art.

The invention is not limited to the particular embodiments herein described and Includes all the technical equivalents that fall within the scope of the claims that follow.

In particular, a connecting device can include one or two loops. A connecting mechanism can include either a screw/threaded portion, or a fastening portion. Consequently, any combination of these mechanisms is possible on the connecting device. For this reason, the invention is not limited to an embodiment including a threaded portion at an end of the spoke, and a fastening portion, at the opposite end.

Furthermore, multiple structural alternatives are possible. For example, an insert can laterally project with respect to a loop, or conversely be slightly set back.

Still, a screw or threaded portion of the shank can be a male portion, to form a screw, or conversely a female portion, to form a screw nut. In this second case, a screw can be arranged in the rim or in the hub.

The invention claimed is:

1. A wheel comprising:
   a rim;
   a hub;
   at least one device for connecting the rim to the hub, the connecting device comprising:
      a composite spoke;
      a first mechanism for connecting the spoke to the rim or to the hub;
      the spoke comprising an elongated body extending in a longitudinal direction between a first end and a second end;
      the elongated body and the first and second ends comprising fibers;
      the fibers being arranged to form a first loop at the first end;
      the first connecting mechanism comprising:
         a first insert housed in the first loop;
         a first shank affixed to the first insert, the first shank being elongated along the longitudinal direction and extending in the longitudinal direction through the first loop;
         a first screw portion or a fastening portion being defined on the first shank.

2. A wheel according to claim 1, wherein:
   the first insert extends transversely of the longitudinal direction between a first lateral surface and a second lateral surface;
   the first insert having a curved connecting surface between the lateral surfaces.

3. A wheel according to claim 1, wherein:
   also housed in the first loop is a plug.

4. A wheel according to claim 1, wherein:
   the first loop has an inner housing;
   the first insert entirely fills said inner housing of the first loop.

5. A wheel according to claim 1, wherein:
   a bushing is in contact with and is housed within the first loop.

6. A wheel according to claim 1, wherein:
   the first shank has a second screw portion opposite the first screw portion;
   the second screw portion being screwed into a threaded opening of the first insert, the threaded opening being oriented along the longitudinal direction.

7. A wheel according to claim 1, wherein:
the first shank and the first insert form a unitary one-piece element.

8. A wheel comprising:
a rim;
a hub;
at least one device for connecting the rim to the hub, the connecting device comprising:
 a composite spoke;
 a first mechanism for connecting the spoke to the rim or to the hub;
 the spoke comprising an elongated body extending in a longitudinal direction between a first end and a second end;
 the elongated body and the first and second ends comprising fibers;
 the fibers being arranged to form a first loop at the first end;
 the first connecting mechanism comprising:
  a first insert housed in the first loop;
  a first shank affixed to the first insert;
   the first shank being oriented along the longitudinal direction;
   the first shank extending through the first loop, the fibers of the first loop being spaced apart to allow the first shank to pass beyond the fibers and through the first loop;
  a first screw portion or a fastening portion being defined on the first shank.

9. A wheel according to claim 1, wherein:
the first shank is screwed into the first insert after the spoke has been pierced in an area of the first loop.

10. A wheel according to claim 1, wherein:
the spoke comprises two distinct arms.

11. A wheel according to claim 1, wherein:
the first shank has a variable transverse cross section along the longitudinal direction.

12. A wheel according to claim 11, wherein:
along the shank in an area closer to the first screw portion than to the first insert, a first transverse cross section of the shank is round;
along the shank in an area closer to the first insert than to the first screw portion, a second transverse cross section of the shank is narrower and elongated relative to the first transverse cross section.

13. A wheel according to claim 1, wherein:
the first screw portion is a first threaded portion.

14. A wheel according to claim 1, wherein:
the fastening portion comprises an enlarged head.

15. A wheel according to claim 1, wherein:
the fibers are arranged to form a second loop and the second end of the spoke;
the connecting device comprises a second connecting mechanism, said second connecting mechanism comprising:
 a second insert housed in the second loop;
 a second shank affixed to the second insert, the second shank being oriented along the longitudinal direction;
 a second screw portion or a fastening being defined on the second shank.

16. A wheel according to claim 1, wherein:
the first shank is substantially aligned with a central longitudinal axis of the spoke.

17. A wheel according to claim 1, wherein:
the connecting device is transversely symmetrical.

18. A wheel according to claim 1, wherein:
the connecting device is symmetrical thickness-wise.

19. A wheel according to claim 2, wherein:
the first shank is substantially midway between the first and second lateral surfaces of the first insert.

20. A connecting device for connecting a rim and a hub of a wheel, said connecting device comprising:
a composite spoke;
a first mechanism for connecting the spoke to the rim or to the hub;
the spoke comprising an elongated body extending in a longitudinal direction between a first end and a second end;
the elongated body and the first and second ends comprising fibers;
the fibers being arranged to form a first loop at the first end;
the first connecting mechanism comprising:
 a first insert housed in the first loop;
 a first shank affixed to the first insert, the first shank being elongated along the longitudinal direction and extending in the longitudinal direction through the first loop;
 a first screw portion or a fastening portion being defined on the first shank.

21. A wheel according to claim 1, wherein:
the fibers of the first loop are spaced apart to allow the first shank to pass beyond the fibers and through the first loop.

22. A wheel according to claim 1, wherein:
the first shank extends in the longitudinal direction through an extreme end of the spoke.

23. A wheel according to claim 1, wherein:
the first insert has a width and the first loop has a width, said widths extending perpendicular to the longitudinal direction;
the width of the first insert being substantially equal to the width of first loop.

* * * * *